United States Patent [19]
Diederich et al.

[11] Patent Number: 6,077,473
[45] Date of Patent: Jun. 20, 2000

[54] TORCH CUTTING ENCLOSURE HAVING FUME COLLECTION PROVISIONS

[75] Inventors: David J. Diederich; John C. Paddock, both of Avon Lake; Earl A. Burkey, Lorain; Ralph J. Dybiec, North Royalton, all of Ohio

[73] Assignee: USS/Kobe Steel Company, Lorain, Ohio

[21] Appl. No.: 09/074,140

[22] Filed: May 7, 1998

Related U.S. Application Data

[60] Provisional application No. 60/069,682, Dec. 12, 1997.

[51] Int. Cl.⁷ ................................. B23K 7/00; C21C 5/40
[52] U.S. Cl. ............................................. 266/48; 266/158
[58] Field of Search ....................... 266/48, 158; 164/263

[56] References Cited

U.S. PATENT DOCUMENTS

| | | |
|---|---|---|
| 3,380,371 | 4/1968 | Scheel . |
| 3,539,168 | 11/1970 | Pfeuffer . |
| 3,604,697 | 9/1971 | Kawana . |
| 3,648,996 | 3/1972 | Yonezawa et al. . |
| 3,809,376 | 5/1974 | Plazier . |
| 4,050,367 | 9/1977 | Eakes . |
| 4,050,682 | 9/1977 | Baum . |
| 4,081,269 | 3/1978 | Nomine et al. . |
| 4,087,670 | 5/1978 | Miller ........................................ 266/48 |
| 4,243,208 | 1/1981 | Laimer . |
| 4,256,289 | 3/1981 | Neuner et al. . |
| 4,270,738 | 6/1981 | Dangeleit et al. . |
| 4,379,548 | 4/1983 | Boshoven . |
| 4,460,389 | 7/1984 | Baum et al. . |
| 4,527,609 | 7/1985 | Nugent . |
| 4,568,065 | 2/1986 | Talonen . |
| 4,724,895 | 2/1988 | Mulesa . |
| 4,792,123 | 12/1988 | Moser et al. . |
| 4,836,510 | 6/1989 | Weber et al. . |

*Primary Examiner*—Scott Kastler
*Attorney, Agent, or Firm*—Fay, Sharpe, Fagan, Minnich & McKee, LLP

[57] ABSTRACT

A torch cutting and fume collecting enclosure is disclosed that is particularly adapted for the collection of lead-containing fumes and gases emitted during cutting of steel strands. The enclosure comprises a plurality of walls and two flexible barriers disposed on opposite ends of the enclosure, one at a receiving end, and the other at an output end of the enclosure. The enclosure further comprises a unique air handling system comprising one or more collector hoods, ducts and plenums for collecting and moving air and other gas flows from the enclosure for subsequent treatment and/or discharge. The air handling system utilizes a unique tapered configuration for one or more plenums that reduces the tendency for particulates to separate from an air or gas flow.

15 Claims, 4 Drawing Sheets

TORCH CUTTING ENCLOSURE HAVING FUME COLLECTION PROVISIONS

CROSS-REFERENCED RELATED APPLICATIONS

The present application claims priority from U.S. Provisional Application Ser. No. 60/069,682, filed Dec. 12, 1997.

BACKGROUND OF THE INVENTION

1. Field of the Invention

The present invention relates to a system and apparatus for collecting fumes emitted from a torch cutting operation. The system is particularly adapted for collecting fumes associated with torch cutting of continuously casted leaded steel strands.

2. Description of the Related Art

Prior artisans have disclosed various techniques for collecting fumes, gases, or smoke that are emitted or otherwise generated during cutting operations in the manufacture of steel. During such manufacture, steel is typically cut or otherwise severed by a high temperature cutting torch. This cutting operation produces copious amounts of fumes, gases, and/or smoke. If leaded steel is being cut, the resulting fumes contain significant amounts of lead. Lead-containing dust is also produced from cutting operations. It is well known that lead poses significant health risks and so, efforts have been made to collect such fumes, gases, and dust.

In U.S. Pat. No. 4,724,895, Mulesa disclosed a fume control system for the continuous casting of leaded steel. Referring to FIG. 2 of that patent, Mulesa described a flume 66 that is operably connected to an exhaust manifold 68. Fumes generated from a torch cutting operation are said to be drawn into the flume and exhausted through outlets 67. Although satisfactory in some respects, there still remains a need for an improved technique and system for the collection of fumes emitted or associated with torch cutting operations, particularly in the manufacture of leaded steel.

A problem associated with collecting airflows, gases, or smoke containing airborne or otherwise entrained lead particles, is separation of the lead particles from the carrier gas, e.g., air. Upon separation, the lead particles fall from the carrier gas and typically form lead-containing deposits upon exposed surfaces. Formation and existence of such deposits significantly increases the risk of exposure to lead. The potential for disentrainment or separation of lead particles from a carrier gas is particularly great when the velocity of the carrier gas is relatively slow. Although airflow velocities across a ventilation or duct system can generally be increased by increasing the pressure differential created by a fan or blower driving the system, this approach increases the energy requirements of the fan or blower. As will be appreciated, this is undesirable, particularly for a large scale manufacturing operation. Accordingly, there is a need for a structure and technique for reducing the tendency of lead particles to separate from a carrier gas, and thereby increase the proportion of lead collected or recovered.

Another problem associated with the collection of airflows or gases from a torch cutting enclosure is reducing the escape of air or gases containing hazardous agents such as lead from the enclosure while retaining flexibility of use for the enclosure so that it may be used in conjunction with a variety of manufacturing processes. If the manufacturing process is a continuous one and so there is typically a continuous output of steel product to be cut, it is difficult to provide a sealed, or relatively so, enclosure for torch cutting of the steel product without the enclosure being specifically tailored in accordance with the particular configuration or shape of steel product. As will be appreciated, an enclosure that is effectively sealed and which receives a continuous feed of one type of steel product, perhaps a large or tall profile beam, would most likely not provide the same degree of sealing if the steel product were changed, such as to a low profile sheet-like product. Of course, an enclosure could be structurally modified between changes in product runs, such as by re-sizing openings in the enclosure through which the steel product passes, but this would result in additional time, labor, and expense. Accordingly, there is a need for a torch cutting enclosure which provides a relatively sealed interior, and yet which may accommodate a wide array of shapes and sizes of product brought into the enclosure, without a significant loss of sealing efficiency.

SUMMARY OF THE INVENTION

The present invention achieves the foregoing objectives and provides, in a first aspect, a unique fume collecting system. The system comprises an enclosure having a particular structure and configuration, and a flexible heat resistant barrier disposed in one or more openings defined in the enclosure. The enclosure includes two side walls and a top wall that define a front opening and an opposite rear opening which provide access to the interior of the enclosure. The enclosure also defines at least one exhaust port for air flow exiting the interior of the enclosure. The flexible heat resistant barrier prevents, or at least significantly minimizes, the escape of hazardous fumes from within the enclosure.

In another aspect, the present invention provides a fume collecting system comprising an enclosure and an air flow plenum having a particular configuration to reduce disentrainment of hazardous agents from an air or gas flow. The air flow plenum is in communication with a plurality of exhaust ports defined in the enclosure. The enclosure has a unique structure and configuration including a pair of side walls and a top wall that collectively define at least one opening that provides access to the interior of the enclosure. The plenum has a tapered configuration and includes a first end, a second end opposite from the first end, and a tapering wall extending between the first end and the second end. A cumulative air or gas flow is withdrawn from the plenum at the second end. The tapering configuration of the plenum is such that the cross-sectional area of the plenum near the second end is greater than the cross-sectional area of the plenum near the first end.

In yet another aspect, the present invention provides a fume collecting system comprising, in part, an enclosure having a particular structure and configuration, a plurality of fume collector hoods disposed within the interior of the enclosure, and a plurality of ducts also disposed within the interior of the enclosure. The enclosure includes a pair of side walls and a top wall that collectively define at least one opening which provides access to the interior of the enclosure. The top wall further defines a plurality of exhaust ports for air flow exiting the interior of the enclosure. The plurality of ducts extend between and provide communication between the exhaust ports defined in the enclosure top wall and the corresponding collector hoods disposed within the interior of the enclosure.

DESCRIPTION OF THE PREFERRED EMBODIMENTS

Figure 1:
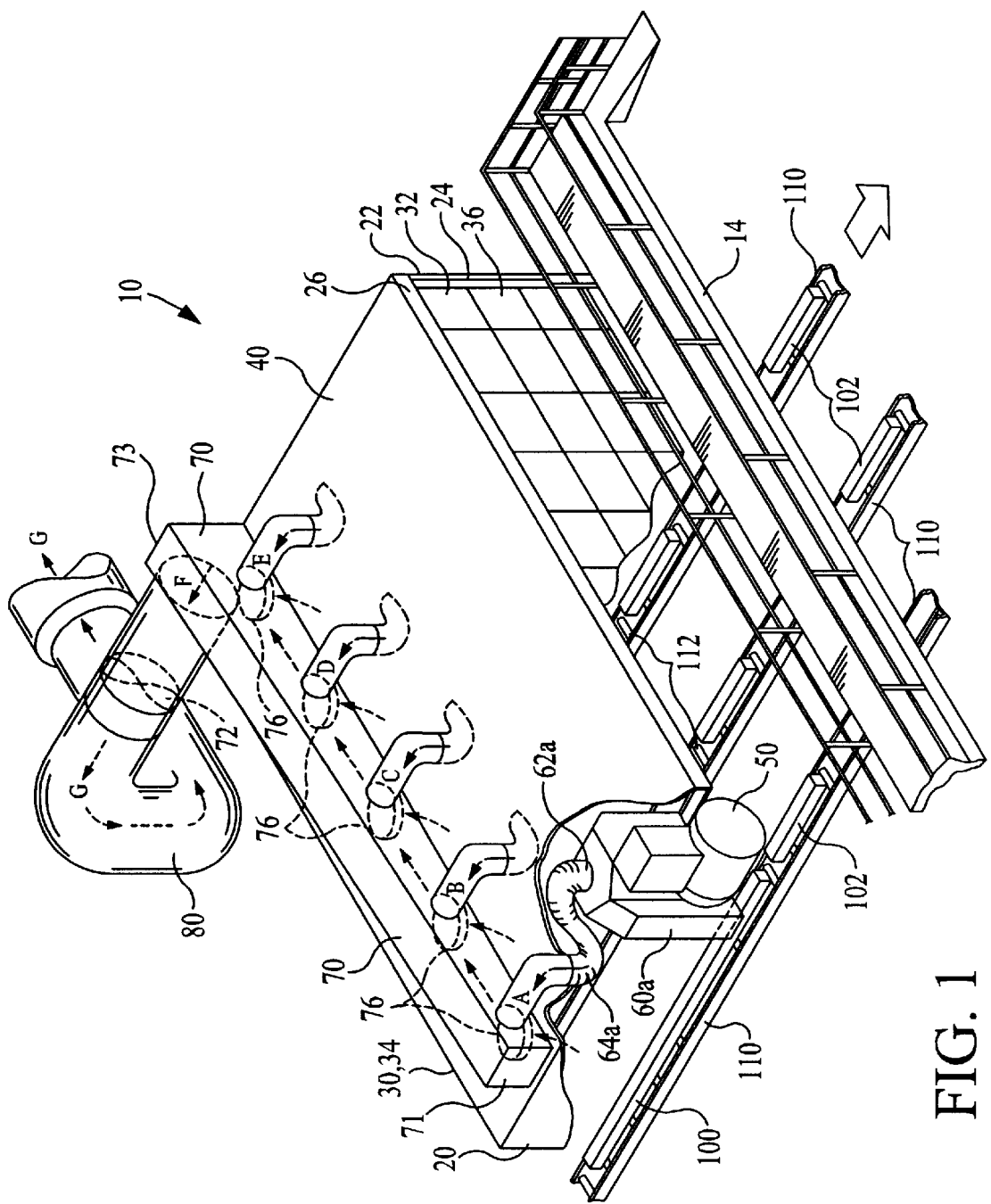
FIG. 1 is a perspective and partial sectional view of a preferred embodiment torch cutting enclosure in accordance with the present invention.

FIGS. 1 through 4 illustrate a torch cutting and fume collecting system 10 in accordance with the present invention. The system 10 is particularly adapted for collecting hazardous agents such as lead during a torch cutting operation. The term "hazardous agents" as used herein includes agents, components, and particles of materials or components that are hazardous or potentially hazardous to human health, or which are considered to be pollutants or contaminants and which may be carried, entrained, or otherwise transported by a moving air flow or gas flow. An example of a hazardous agent is lead.

The preferred embodiment system 10 comprises a generally enclosed structure surrounding the top and sides of a torch cutting unit having a first side wall 20, a second side wall 22 opposite from the first side wall 20, a top wall 40, and a floor 42. The structure may include or be formed from one or more vertical support members 24 and one or more horizontal support members 26. The first and second side walls 20 and 22, and the top wall 40, extend between and generally define a front receiving opening 30, and a rear receiving opening 32 opposite from the front opening 30. Disposed generally within the front receiving opening 30 is a front flexible barrier 34. Similarly, disposed generally within the rear receiving opening 32 is a rear flexible barrier 36.

Figure 2:
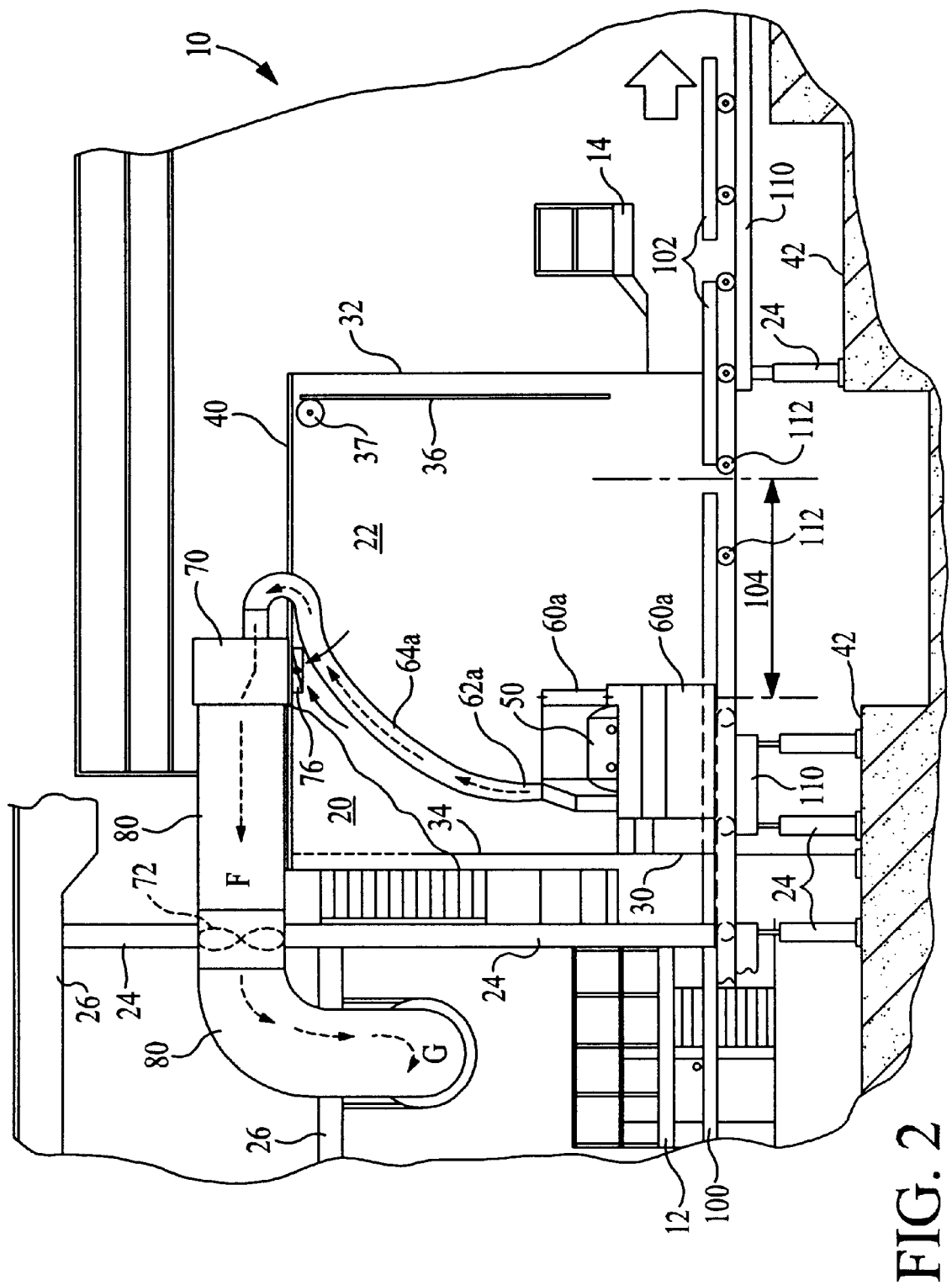
FIG. 2 is a side elevational and partial sectional view of the preferred embodiment torch cutting enclosure depicted in FIG. 1.

The flexible barriers 34 and 36 are preferably formed from a high temperature resistant and corrosion resistant flexible material. The flexible barriers 34 and 36 are also preferably in the form of thin sheets of a woven material as described above. Most preferably, each flexible barrier includes a retraction assembly, such as a spool 37 as shown in FIG. 2 around which the barrier may be wound to raise or otherwise retract the barrier. The retraction assembly may also include a spring assembly or motor to facilitate retraction of the barrier. Use of one or both flexible barriers 34 and 36 in the preferred embodiment system 10 is important. The barriers 34 and 36 prevent, or at least significantly minimize, the escape of hazardous agents from the enclosure. The flexible barriers 34 and 36 are relatively lightweight, and so are easier to move or adjust than if conventional rigid heat protective panels were employed. Additionally, use of the barriers 34 and 36 further reduce the escape or emission of hazardous agents, hot air, and distracting light flashes from the cutting operations performed within the enclosure.

Referring to the referenced figures, it will be understood that the flexible barriers 34 and 36 may be easily adjusted such that the distance below a lowermost edge of a barrier, to the floor or uppermost portion of steel product being transported through the enclosure, is readily changed by extending or retracting the barrier. The use of movable flexible barriers also enables easy adjustment of the amount of air drawn into the enclosure by the air handling system described in greater detail below.

The preferred embodiment torch cutting and fume collecting system 10 generally houses one or more torch cutter units 50 as known in the art. The torch cutter units 50 serve to sever or otherwise cut continuous steel strands 100 into steel segments 102, each segment 102 having a predetermined cut length 104. It will be understood that although the preferred embodiment system 10 is described in conjunction with the cutting of steel strands, the present invention is not limited to this type of product.

Figure 3:
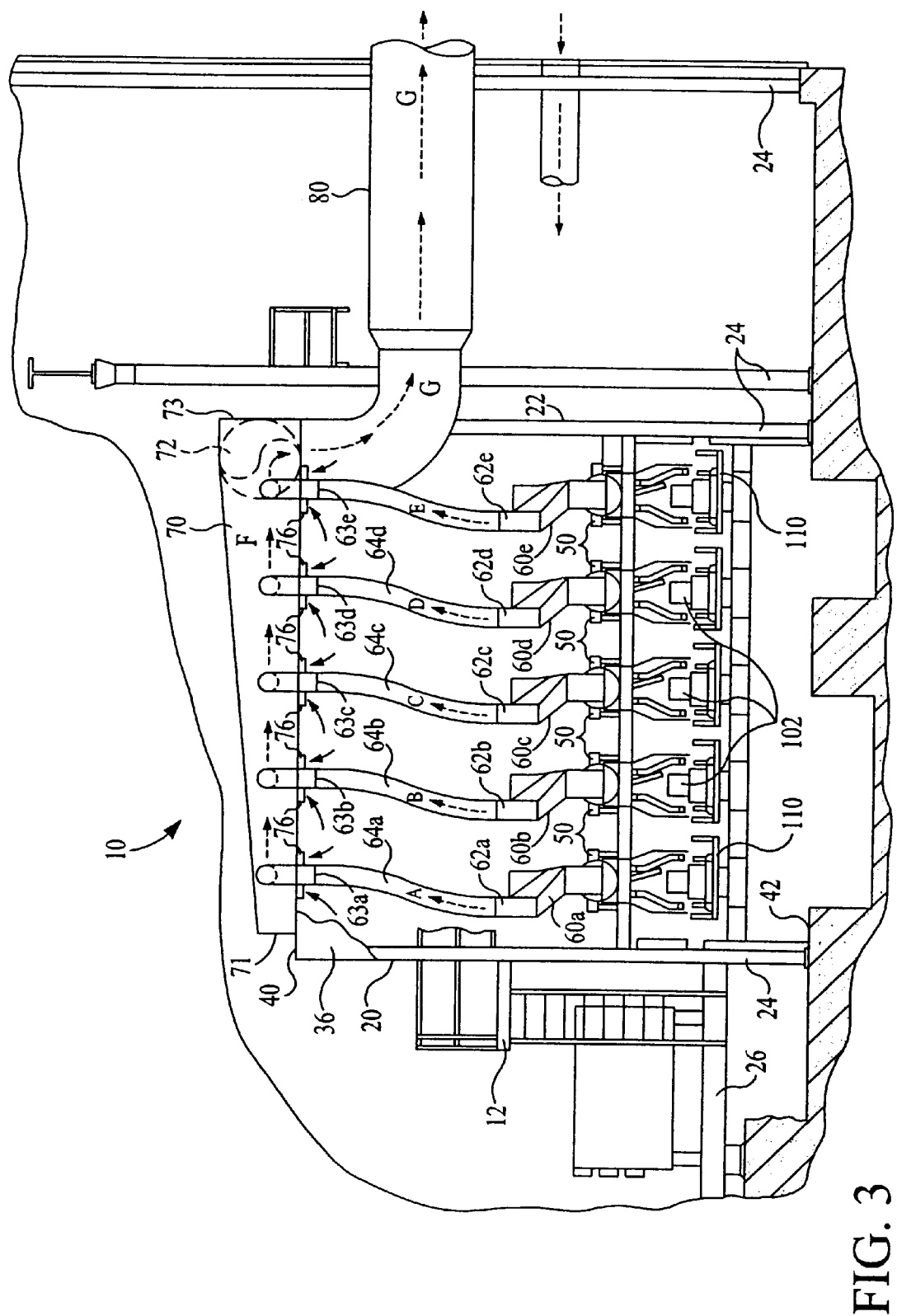
FIG. 3 is a rear elevational and partial sectional view of the preferred embodiment torch cutting enclosure shown in FIG. 1.
Figure 4:
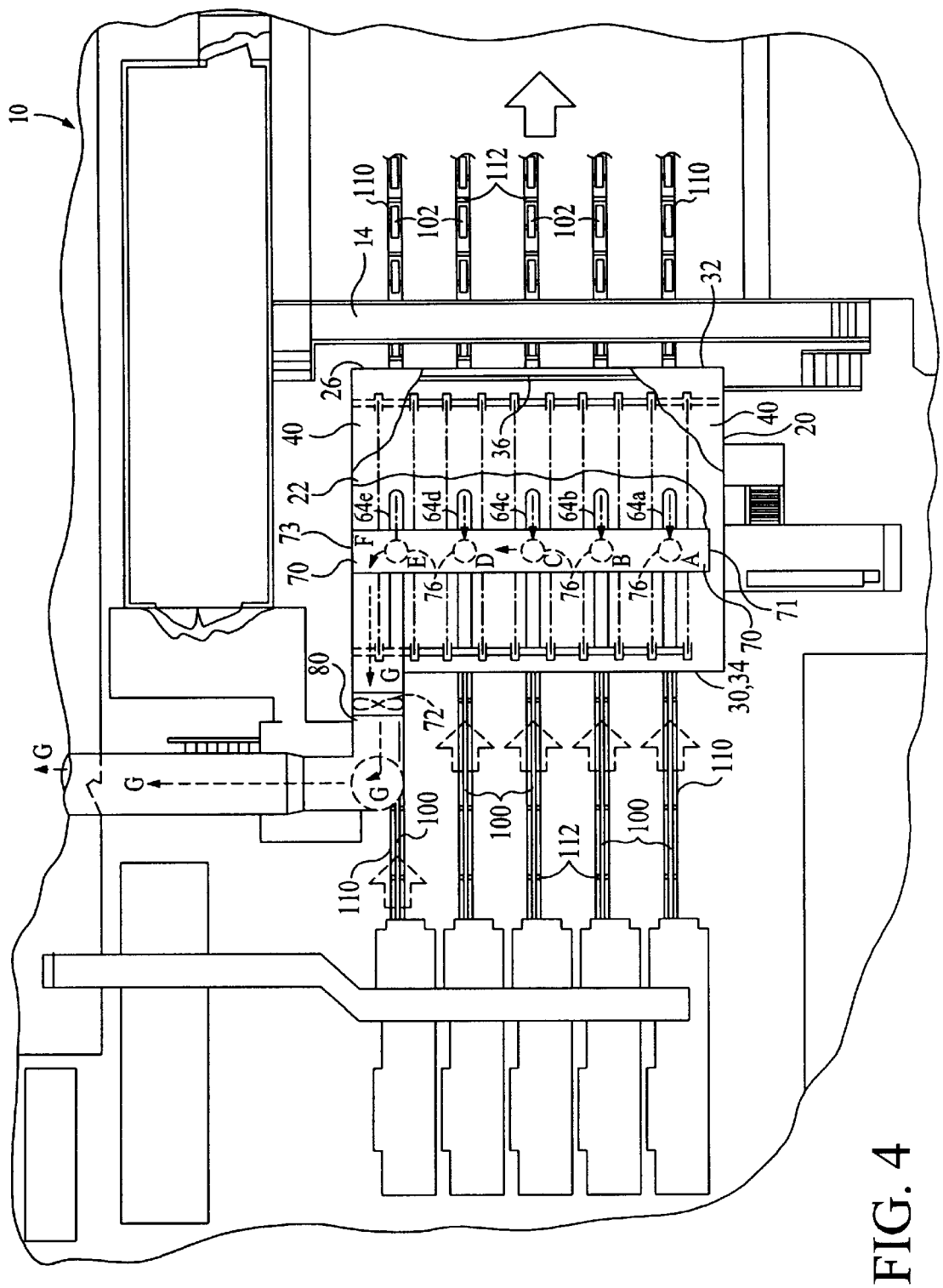
FIG. 4 is a plan and partial sectional view of the preferred embodiment torch cutting enclosure illustrated in FIG. 1.

The preferred embodiment system 10 may further comprise provisions for enabling or facilitating operator use and viewing. For example, a front platform 12, as shown in FIGS. 2 and 3, may be provided for operators to inspect the front portion of the enclosure and system 10. A rear walkway 14 may also be provided.

The preferred embodiment system 10 utilizes a unique air handling system as follows. Associated with each torch cutter unit 50 is a collector hood 60 that provides a hood exit port 62 and a duct 64 extending from the hood 60. In the application illustrated in the referenced figures, a total of five (5) torch cutter units 50 are utilized. Accordingly, a total of five (5) sets of collector hoods 60a, 60b, 60c, 60d, and 60e are provided, each having a corresponding exit port, 62a, 62b, 62c, 62d, and 62e. Extending upward and generally away from a respective torch cutter unit 50 is a duct 64a, 64b, 64c, 64d, and 64e. It is also preferred to provide a balancing damper 63 in each of the ducts 64 to regulate or adjust the relative and total flows through the ducts 64. Specifically, it is preferred to provide a damper 63a in duct 64a, a damper 63b in duct 64b, a damper 63c in duct 64c, a damper 63d in duct 64d, and a damper 63e in duct 64e.

The ducts 64 may be formed from an array of suitable temperature and corrosion resistant materials. It is preferred that the ducts 64 be formed from a flexible material, such as for example a double silicon glass composite hose material. Such materials preferably have a temperature rating of about 550° F. Fabric cuffs may also be utilized on each end of a duct 64 to facilitate attachment of the duct 64 to a corresponding exit port 62 of a hood 60, and minimize undesirable noise and vibration of the resulting assembly.

Each of the ducts 64 extends to and is in communication with a plenum 70. The plenum 70 collects and directs the collected fumes and air from the ducts 64 into a master plenum 80. Disposed within the master plenum 80 is an air moving assembly 72. The air moving assembly 72 may be in the form of a conventional blower or fan unit as known in the art.

The plenum 70 preferably utilizes a unique tapered configuration as illustrated in FIGS. 1 and 3. The master plenum 80 is preferably in communication with the plenum 70 at a large or extended end 73. The extended end 73 is opposite from a narrowed or tapered end 71. The extended end 73 is the end at which a cumulative air or gas flow, i.e., collected from the ducts 64, is withdrawn from the plenum 70. Preferably, the direction of airflow through the plenum 70 is such that the extended end 73 is at the portion of the plenum 70 toward which flows the cumulative air flow from the ducts 64. The use of the tapered configuration for the plenum 70, particularly in conjunction with the series of linearly spaced and aligned ducts 64a, 64b, 64c, 64d, and 64e, results in a more laminar and constant velocity of flows in the plenum 70 than if the plenum 70 had a constant cross-sectional configuration over its length, i.e., such as if the plenum were rectangular or cylindrical. This is desirable since a more constant velocity and pressure at various locations throughout the plenum 70 promotes entrainment and transport of lead particles through the system. It is undesirable for lead or other hazardous agents to separate from the air or gas flow and deposit and collect within the various ducts and plenums.

Additional details of the structure and operation of the preferred embodiment fume collecting system 10 are as follows. Referring further to FIGS. 1 through 4, one or more steel strands 100 are directed or otherwise transported to the preferred embodiment torch cutting and fume collecting system 10. The steel strands 100 are supported on a number of trackways 110, each utilizing a plurality of rollers 112 to facilitate movement of the strands 100. Once the strands 100 enter the system 10, each strand 100 is appropriately positioned under a corresponding torch cutter unit 50. The operation of each torch cutter unit 50 is controlled, at least in part, by a sensor that registers the linear movement of the steel strands 100. This enables the strands 100 to be cut to an appropriate cut length 104 and thus be cut into segments 102. The resulting segments 102 are transported out of the system 10 along the trackways 110 and again, such movement being facilitated by rollers 112.

During the operation of each torch cutter unit 50, copious amounts of fumes, smoke, and gases are generated. These fumes and gases are drawn into a corresponding collector hood 60 positioned generally above and around each torch cutter unit 50. Once the fumes enter the collector hood 60, they are directed generally upwards to the hood exhaust port 62, at which they enter a corresponding duct 64. The collected fumes and gases are then transported or directed through the duct 64 and into the plenum 70. Referring to FIGS. 1 and 3, the collected fumes from the collector hood 60a are transported through the duct 64a and designated as flow A. The fumes and gases collected from the collector hood 60b are directed into the duct 64b and directed to the plenum 70 as flow B. Similarly, the collected fumes from the collector hood 60c are directed through the duct 64c as flow C. The collected fumes from the collector hood 60d are directed through the duct 64d as flow D. And, the collected fumes from the collector hood 60e are sent through the duct 64e and directed to the plenum 70 as flow E. The flows A, B, C, D, and E enter the plenum 70 and generally form a cumulative flow F which is then directed to the master plenum 80. A plurality of inlet ducts 76 are also provided along the length of the plenum 70, that provide airflow from the interior of the torch cutting enclosure to the plenum 70. Preferably, the number of inlet ducts 76 equals the number of ducts 64 extending between the hoods 60 and the plenum 70. In the preferred embodiment shown in the referenced drawings, a total of five (5) inlet ducts 76 are provided. It is also preferred that a balancing damper as known in the art is provided as part of, or at least serving, each inlet duct 76. Displacement of all of the noted flows is preferably achieved by the air moving assembly 72, preferably disposed within the master plenum 80. The resulting flow through the master plenum 80, designated as flow G, may be sent to one or more filtering apparatuses, such as a baghouse as known in the art. The hazardous agents, such as lead, are removed from the flow G by the one or more filtering apparatuses. Upon shutdown, it is preferred to continue the operation of the air moving assembly 72 for at least one (1) additional hour to remove any residual hazardous agents such as lead from the system. Although the preferred embodiment torch cutting system 10 is primarily utilized to collect hazardous agents, the system 10 may also function to assist or promote cooling of the steel strands or cut segments brought into or through the system.

A dilution air damper (not shown) is preferably installed before the filtering apparatus or baghouse with a duct mounted thermocouple to protect the baghouse from over heating. The damper may be configured to open to provide cooling air to reduce the temperature when the incoming airstream temperature to the baghouse exceeds 275° F. The thermocouple or other temperature sensor is preferably exposed or otherwise in thermal communication with air flow in the duct traveling to the baghouse. The thermocouple provides a signal, such as an analog or digital control signal, to a controller. The controller is preferably in operative communication with the dilution air damper. If the temperature of the air flow is greater than 275° F., or some other predetermined temperature value, the controller drives the damper to enable air of lower temperature to enter the duct and effectively reduce the temperature of the air flow.

The baghouse or filtering equipment may include inlet and outlet manifolds, filter modules, filter media, fabric cleaning mechanisms, dust handling conveyors, an air compressor package, bulk bag dust loading station, an exhaust fan with variable frequency drive, other exhaust fans, and an interconnecting ductwork and stack. A variable frequency drive is preferably provides on the exhaust fan to provide the flexibility to change fan performance during air balancing of the system and to make adjustments to the system capacity air volumes.

Although not wishing to be bound to any particular size or capacity of the preferred embodiment torch cutting and fume collecting system 10, the following capacities are disclosed to illustrate the preferred relative proportions of air flows in the system. During operation, each of the five ducts 64 in the preferred embodiment enclosure 10 exhaust about 3,000 acfm from the enclosure. These ducts 64 provide a total of about 15,000 acfm from the enclosure. Again, although not wishing to be bound to any particular size or capacity, a preferred size for each of the inlet ducts 76 is 20 inches diameter, each providing an exhaust rate of about 9,500 acfm. Accordingly, the five ducts 76 provide a total exhaust rate from the enclosure of about 47,500 acfm. The design capacity at the master plenum 80, downstream from the air moving assembly 72, is about 62,500 acfm.

The invention has been described with reference to the preferred embodiments. Obviously, modifications and alterations will occur to others upon a reading and understanding the preceding detailed description. It is intended that the invention be construed as including all such modifications and alterations in so far as they come within the scope of the appended claims or the equivalents thereof.

What is claimed is:

1. A fume collecting system adapted for collecting fumes from above a torch cutting unit that are emitted during torch cutting of steel strands, said system comprising:

an enclosure surrounding the top and sides of a torch cutting unit having (i) a first sidewall, (ii) a second sidewall spaced from said first sidewall, and (iii) a top wall extending between said first sidewall and said second sidewall, wherein first said first sidewall, said second sidewall, and said top wall define a front opening and an opposite rear opening, both said front opening and said rear opening providing access to the interior of said enclosure, said enclosure defining at least one exhaust port directly above said torch cutting unit for air flow exiting the interior of said enclosure; and a lightweight and movable heat resistant barrier of flexible material disposed in at least one of said front opening and said rear opening;

wherein said system collects and directs said fumes and said air flow from directly above said torch cutting unit.

2. The fume collecting system of claim 1 wherein said lightweight and movable heat resistant barrier of flexible material disposed in said front opening and said system further comprises:

a second lightweight and movable heat resistant barrier of flexible material disposed in said rear opening.

3. The fume collecting system of claim 1 wherein said at least one exhaust port comprises a plurality of exhaust ports defined along said top wall, and said system further comprising:

a plenum for the removal of fumes and hazardous particles in communication with said plurality of exhaust ports.

4. The fume collecting system of claim 3 wherein said plenum has a tapered configuration and is in communication with an air moving assembly, the operation of which draws air from the interior of said enclosure, through said plurality of exhaust ports, and into said plenum.

5. The fume collection system of claim 4 wherein said tapered plenum includes a first end, a second opposite end, and a plurality of sidewalls extending between said first and second ends, wherein at least two of said sidewalls are nonparallel to each other to thereby provide said tapered configuration.

6. The fume collecting system of claim 3 further comprising:

a plurality of fume collector hoods disposed within the interior of said enclosure; and a plurality of ducts also disposed within the interior of said enclosure, wherein each of said ducts extends and provides communication between a respective exhaust port defined in said top wall and a corresponding collector hood.

7. A fume collecting system adapted for collecting fumes from above a torch cutting unit that are emitted from torch cutting of steel, said system comprising:

an enclosure surrounding the top and sides of a torch cutting unit having (i) a first sidewall, (ii) a second sidewall spaced from said first sidewall, and (iii) a top wall extending between said first sidewall and second sidewall, wherein said first sidewall, said second sidewall and said top wall define at least one opening providing access to the interior of said enclosure, said top wall defining a plurality of exhaust ports disposed above said torch cutting unit for air flow exiting the interior of said enclosure; and an air flow plenum for the removal of fumes and hazardous particles in communication with said plurality of exhaust ports, said air flow plenum having a tapered configuration in which said plenum includes a first end, a second end opposite from said first end, and a tapering wall extending between said first end and said second end, wherein the cross sectional area of said plenum proximate to said second end is greater than the cross sectional area of said plenum proximate to said first end;

wherein said system collects and directs fumes and said air flow from directly above said torch cutting unit.

8. The fume collecting system of claim 7 further comprising:

a lightweight and movable heat resistant barrier of flexible material disposed in said at least one opening defined in said enclosure by said first sidewall, said second sidewall, and said top wall.

9. The fume collecting system of claim 7 further comprising:

an air moving assembly in communication with said plenum.

10. The fume collecting system of claim 7 further comprising:

a plurality of fume collector hoods disposed within the interior of said enclosure; and a plurality of ducts also disposed within the interior of said enclosure, wherein each of said ducts extends and provides communication between a respective exhaust port defined in said top wall and a corresponding collector hood.

11. A fume collecting system adapted for collecting fumes from above a torch cutting unit that are emitted from torch cutting of steel, said system comprising:

an enclosure surrounding the top and sides of a torch cutting unit having (i) a first sidewall, (ii) a second sidewall spaced from said first sidewall, and (iii) a top wall extending between said first sidewall and said second sidewall, wherein said first sidewall, said second sidewall, and said top wall define at least one opening providing access to the interior of said enclosure, said top wall defining a plurality of exhaust ports located above said torch cutting unit for air flow exiting the interior of said enclosure above said torch cutting unit;

a plurality of fume collector hoods disposed within the interior of said enclosure and above said torch cutting unit; and a plurality of ducts also disposed within the interior of said enclosure, wherein each of said ducts extend and provide communication between a respective exhaust port defined in said top wall and a corresponding collector hood.

12. The fume collection system of claim 11 further comprising:

a lightweight and movable heat resistant barrier of flexible material disposed in said at least one opening of said enclosure.

13. The fume collecting system of claim 11 further comprising:

a plenum for the removal of fumes and hazardous particles in communication with said plurality of exhaust ports.

14. The fume collecting system of claim 13 wherein said plenum has a tapered configuration and is in communication with an air moving assembly, the operation of which draws air from the interior of said enclosure, through said plurality of exhaust ports, and into said plenum.

15. The fume collection system of claim 14 wherein said tapered plenum includes a first end, a second opposite end, and a plurality of sidewalls extending between said first and second ends, wherein at least two of said sidewalls are nonparallel to each other to thereby provide said tapered configuration.

* * * * *